(12) United States Patent
Born et al.

(10) Patent No.: US 12,078,964 B2
(45) Date of Patent: Sep. 3, 2024

(54) TIMEPIECE MECHANISM PROVIDED WITH A MAGNETIC GEAR

(71) Applicant: The Swatch Group Research and Development Ltd, Marin (CH)

(72) Inventors: Jean-Jacques Born, Morges (CH); Jean-Pierre Mignot, Pontarlier (FR); Matthias Imboden, St-Blaise (CH); Cédric Nicolas, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 545 days.

(21) Appl. No.: 17/374,154

(22) Filed: Jul. 13, 2021

(65) Prior Publication Data

US 2022/0050418 A1 Feb. 17, 2022

(30) Foreign Application Priority Data

Aug. 12, 2020 (EP) ..................................... 20190621

(51) Int. Cl.
*G04B 11/00* (2006.01)
*G04B 13/02* (2006.01)

(52) U.S. Cl.
CPC ............ *G04B 11/005* (2013.01); *G04B 13/02* (2013.01)

(58) Field of Classification Search
CPC .............................. G04B 11/005; G04B 13/02
(Continued)

(56) References Cited

U.S. PATENT DOCUMENTS 3,451,280 A * 6/1969 Hetzel .................. G04B 11/005
368/125
2013/0279302 A1* 10/2013 Vardi ...................... G04C 5/005
368/126

(Continued)

FOREIGN PATENT DOCUMENTS

CH 711 932 A2 6/2017
DE 1 087 275 B 8/1960
(Continued)

OTHER PUBLICATIONS

European Search Report issued Mar. 4, 2021 in European Application 20190621.1, filed on Aug. 12, 2020 (with English Translation of Categories of cited documents), 3 pages.

*Primary Examiner* — Edwin A. Leon
*Assistant Examiner* — Kevin Andrew Johnston
(74) *Attorney, Agent, or Firm* — Oblon, McClelland, Maier & Neustadt, L.L.P.

(57) ABSTRACT

A timepiece mechanism including a magnetic gear formed of a first wheel and a second wheel, the first wheel being provided with first alternating magnetic poles forming a magnetic toothing and the second wheel being provided with a toothing made of ferromagnetic material which has a magnetic coupling with the magnetic toothing, such that, when one of the first or second wheels is driven in rotation, this wheel rolls, via the magnetic coupling, over a geometric circle centred on the other wheel and linked to this other wheel. The magnetic gear further includes a ferromagnetic element arranged relative to the first wheel so as to offset at least most of a magnetic disturbance torque to which the first wheel is subjected, resulting from the magnetic coupling, this magnetic disturbance torque having a periodic variation in intensity according to the angular position of the first wheel.

10 Claims, 3 Drawing Sheets

(58) Field of Classification Search
 USPC .......................................................... 368/124
 See application file for complete search history.

(56) References Cited

U.S. PATENT DOCUMENTS

2017/0176946 A1* 6/2017 Junod .................... G04C 3/101
2017/0242403 A1* 8/2017 Di Domenico ........ G04C 5/005

FOREIGN PATENT DOCUMENTS

| | | | |
|---|---|---|---|
| EP | 0 044 905 A1 | | 2/1982 |
| JP | 2000291779 A | * | 10/2000 |
| JP | 2005253292 A | * | 9/2005 |
| JP | 2016200228 A | * | 12/2016 |

* cited by examiner

TIMEPIECE MECHANISM PROVIDED WITH A MAGNETIC GEAR

CROSS-REFERENCE TO RELATED APPLICATION

This application claims priority to European Patent Application No. 20190621.1 filed on Aug. 12, 2020, the entire disclosure of which is hereby incorporated herein by reference.

FIELD OF THE INVENTION

The invention concerns the field of magnetic gears formed of a first wheel and a second wheel in a magnetic gearing relationship, the first wheel being provided with first magnetic poles, arranged circularly and defining a first magnetic toothing, the second wheel being provided with teeth made of ferromagnetic material or with second magnetic poles, these teeth or second magnetic poles being circularly arranged and defining a second magnetic toothing.

In particular, the invention concerns a timepiece mechanism incorporating a magnetic gear.

BACKGROUND OF THE INVENTION

FIG. 1 shows a magnetic gear 2 comprising a small wheel 4 provided with six bipolar magnets 8 having radial and alternating magnetization, these six magnets being regularly arranged around a central portion of the small wheel so as to define a magnetic toothing 9 having six magnetic teeth, and a large wheel 6 located in a general plane in which the small wheel also extends and comprising a ferromagnetic rim with a peripheral toothing 7. Wheel 4 has a central axis 32 defining an axis of rotation of this small wheel and wheel 6 has a central axis 34. In a general case where the large wheel also rotates, central axis 34 defines an axis of rotation of this large wheel. In a particular case, the large wheel is fixedly arranged on a support (a plate or bridge of a timepiece movement) and the small wheel is arranged to rotate at the periphery of the large wheel when this small wheel is driven in rotation by a drive device.

FIG. 2 shows a curve 10 of a magnetic disturbance torque which is exerted on small wheel 4 when it rotates and 'rolls' over a geometric circle linked to large wheel 6 and centred on central axis 34 of the latter. This magnetic disturbance torque has a periodic variation in intensity according to the angular position α of small wheel 4. Angle α is measured from a reference half-axis 30 starting from axis of rotation 32 of the small wheel and intercepting the central axis/axis of rotation of large wheel 6. By definition, reference half-axis 30 is perpendicular to the axis of rotation of small wheel 4. As shown in FIG. 2, the period of sinusoidal curve 10 corresponds to the central angle between two successive bipolar magnets and thus to the angle travelled by the small wheel for magnetic gear 2 to take one step, i.e. small wheel 4 rotates in order to move from one bipolar magnet (defining a magnetic tooth, or, by analogy to a conventional mechanical gear, corresponding to a space between two magnetic teeth) aligned on reference half-axis 30, to the next bipolar magnet (defining the next magnetic tooth or the next space between two magnetic teeth) which, in turn, aligns on this reference half-axis and, such that, at the same time, large wheel 6 rotates (or the axis of rotation of the small wheel rotates about central axis 34 of the large wheel) in order to move from one tooth aligned on the reference half-axis to the next tooth, which, in turn, aligns on this reference half-axis. It will be noted that the large wheel is also subjected to a corresponding magnetic disturbance torque. For reasons related to the clarity of the drawing, the angle of rotation/angular position represented in FIG. 1 by an arrow is measured from a half-axis complementary to reference half-axis 30 (these two half-axes together forming a geometric axis) and thus corresponds to α−180°. Point A in FIG. 2 corresponds to an angle α equal to zero or to an integer multiple of 360°/N, where N is equal to the number of bipolar magnets 8 and thus to the number of magnetic teeth of magnetic toothing 9. The angle 360°/N thus corresponds to an angular period or an angular pitch of magnetic toothing 9.

The angular positions of magnetic gear 2 at points A and E on the FIG. 2 graph correspond to positions of stable equilibrium for this magnetic gear, whereas the angular position of the magnetic gear at point C corresponds to an unstable position of equilibrium. Points B and D on the FIG. 2 graph correspond to the two maximum intensities (respectively positive and negative) and thus to the amplitude of the magnetic disturbance torque. It will be noted that the magnetic disturbance torque occurs in the absence of transmission of a torque between the two wheels, this magnetic disturbance torque tending to move a bipolar magnet 8 in front of a ferromagnetic tooth of wheel 6 and thus to align on reference half-axis 30 a magnetic pole of wheel 4 and a ferromagnetic tooth of wheel 6 (the situation at points A and E of curve 10), the angular positions of the two wheels then corresponding to a minimum potential energy for the magnetic gear.

The magnetic disturbance torque may be significant, possibly as great as (or even greater) than the magnetic torque that can be transmitted between the two wheels of the magnetic gear. To overcome this disturbance torque, a drive device driving one of the two wheels must be able to provide a much higher torque than the magnetic torque transmitted in the magnetic gear to prevent it blocking, which needlessly increases its energy consumption. Moreover, because of its sinusoidal variation, the disturbance torque introduces a relatively large variation in the magnetic torque transmitted in the magnetic gear. Indeed, when small wheel 4 is driven in a positive direction of rotation, the disturbance torque brakes this small wheel during a first angular half-period of magnetic toothing 9, from each position of alignment of a bipolar magnet 8 on reference half-axis 30, and drives this small wheel during the second angular half-period following this first angular half-period (see FIG. 2). The same applies to large wheel 6 over each magnetic period of its magnetic toothing 7, but with the opposite mathematical sign.

SUMMARY OF THE INVENTION

The object of the invention is to overcome the problem of magnetic disturbance torque in a magnetic gear, by eliminating at least most of this disturbance torque.

To this end, the present invention concerns a mechanism comprising a magnetic gear formed of a first wheel and a second wheel, the first wheel being provided with N first alternating magnetic poles which are circularly arranged and define a first magnetic toothing, the second wheel being provided with teeth made of ferromagnetic material or with second alternating and circularly arranged magnetic poles, these teeth or second magnetic poles defining a second magnetic toothing which has a magnetic coupling with the first magnetic toothing such that, when one of the first or second wheels is driven in rotation, this wheel rolls, via the magnetic coupling, over a geometric circle centred on the other wheel and linked to this other wheel. According to the invention, the mechanism further comprises a ferromagnetic element or a set of ferromagnetic elements arranged, relative to the first wheel, so as to offset at least most of a magnetic disturbance torque to which this first wheel is subjected, resulting from said magnetic coupling, this magnetic disturbance torque having a periodic variation in intensity according to the angular position of the first wheel relative to a reference half-axis starting from the central axis of the first wheel and intercepting the central axis of the second wheel.

It will be noted that the rolling of one of the two wheels over a geometric circle centred on the other wheel and linked to this other wheel occurs without mechanical contact, said geometric circle having a radius which depends on the angular pitches of each of the two wheels and on the distance between the respective central axes of these two wheels. 'Magnetic torque' means a torque of magnetic force.

According to a main embodiment, the ferromagnetic element or the set of ferromagnetic elements is arranged to generate a magnetic compensation torque which also has a periodic variation in intensity according to the angular position of the first wheel relative to the reference half-axis, the magnetic compensation torque and the magnetic disturbance torque having a phase shift of substantially 180°.

According to an advantageous variant, the ferromagnetic element or set of ferromagnetic elements has a plane of symmetry including the reference half-axis and the central axis of the first wheel.

According to an advantageous variant, the ferromagnetic element or the set of ferromagnetic elements is arranged to generate on the first wheel an overall compensation magnetic attraction force which is aligned on the reference half-axis with an opposite direction to that of the overall magnetic attraction force exerted by the second wheel on the first wheel.

BRIEF DESCRIPTION OF THE DRAWINGS

The invention will be described in detail below with reference to the annexed drawings, given by way of non-limiting examples, in which.

DETAILED DESCRIPTION OF THE INVENTION

With reference to FIGS. 3 to 7, there will be described hereinafter a first embodiment of a magnetic gear according to the invention.

Figure 1:
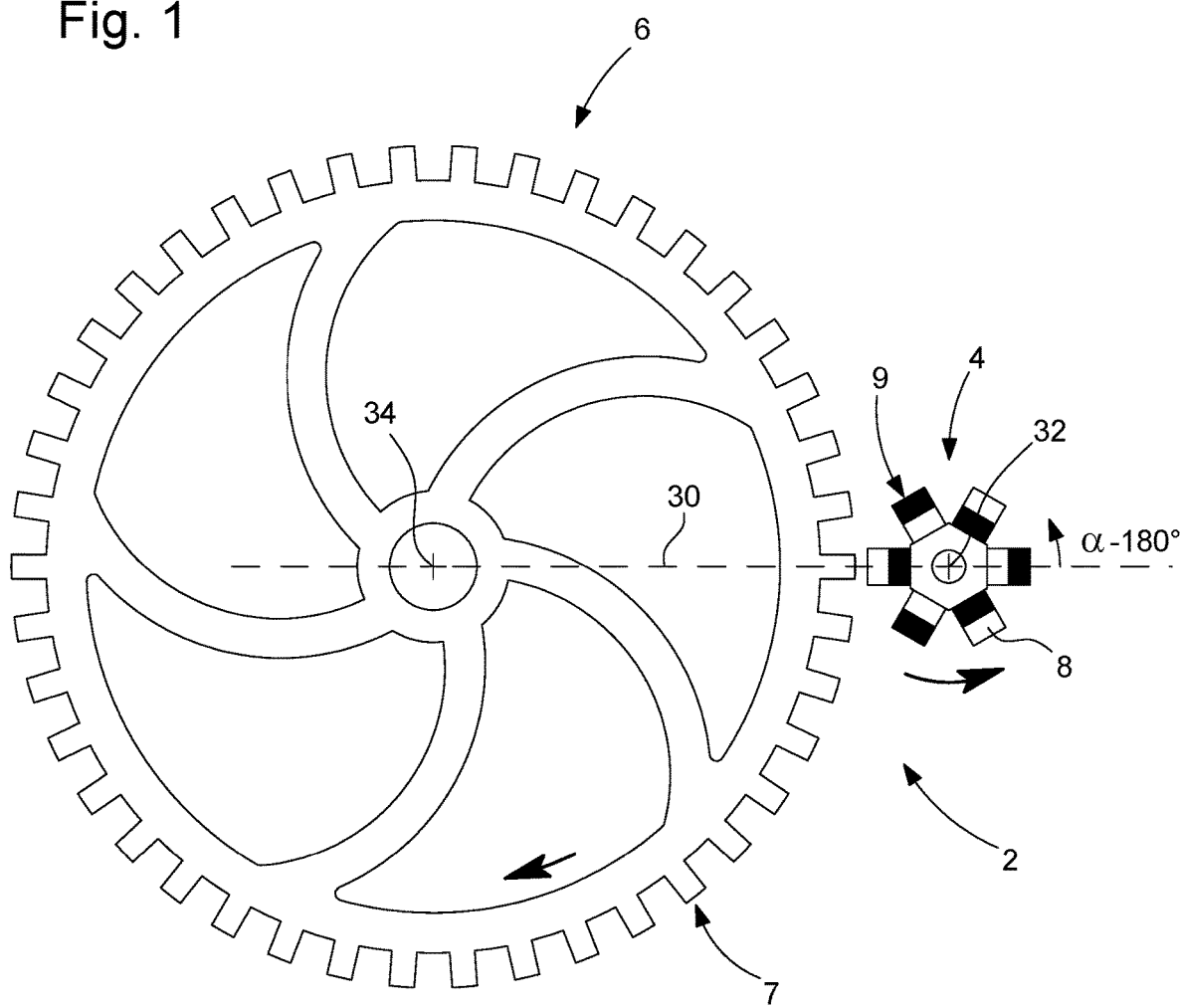
FIG. 1, already described, shows a magnetic gear according to the prior art.
Figure 2:
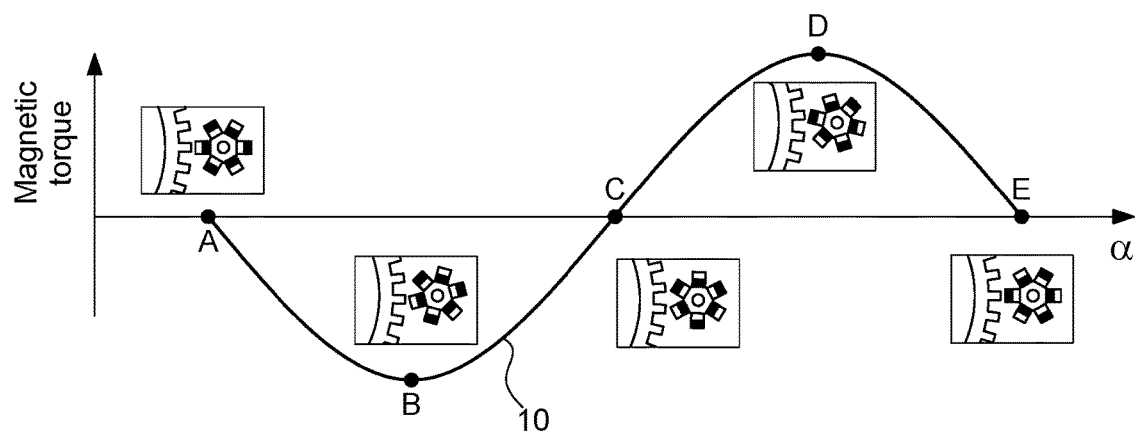
FIG. 2 already described, graphically represents a magnetic disturbance torque occurring in the magnetic gear of FIG. 1.
Figure 3:
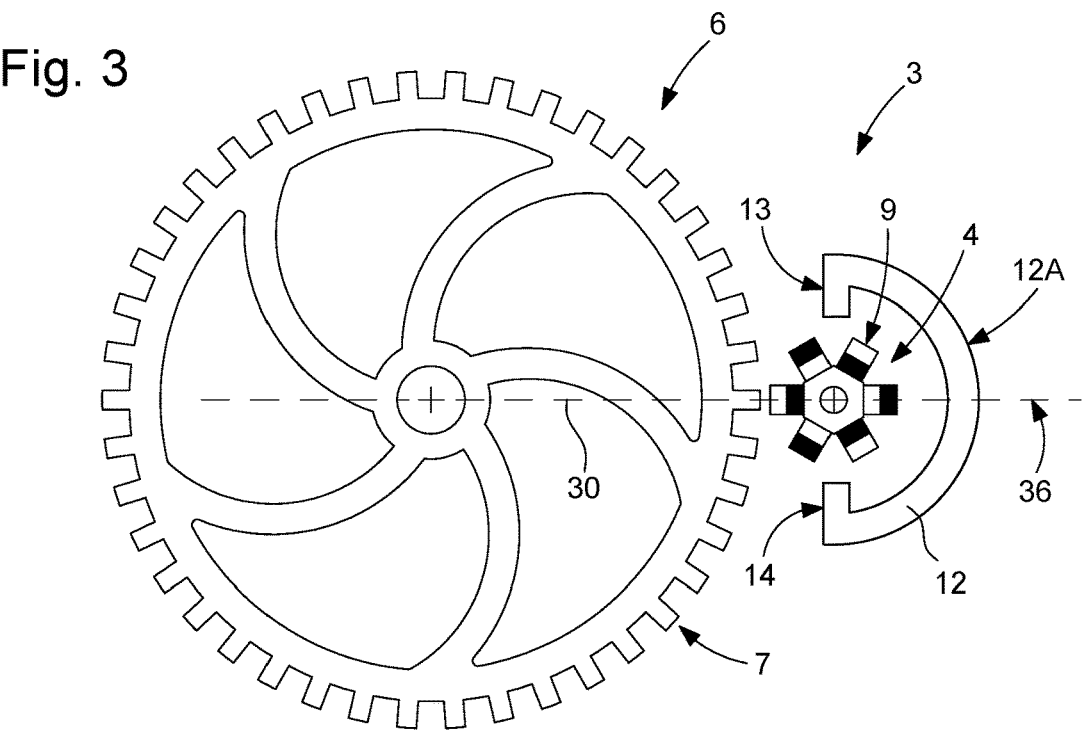
FIG. 3 shows a first embodiment of a mechanism incorporating a magnetic gear according to the invention (only the magnetic gear is shown).
Figure 4:
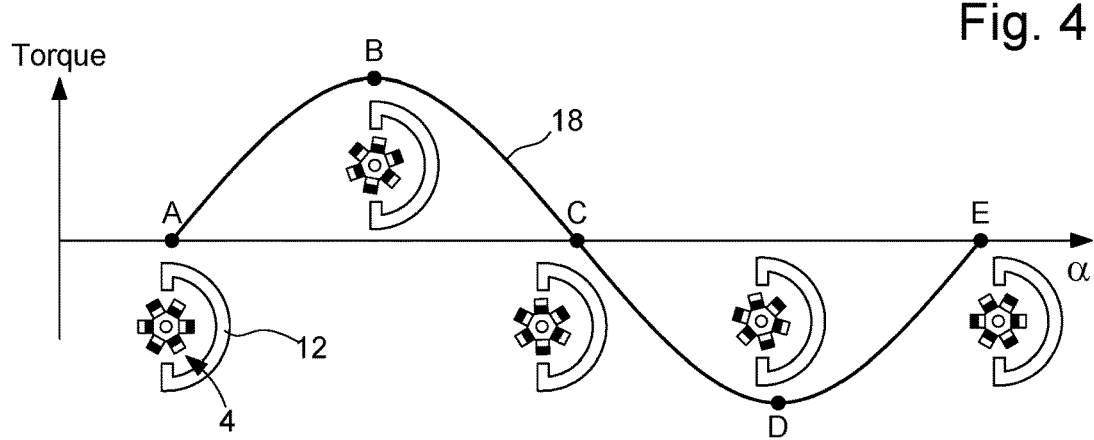
FIG. 4 graphically represents a magnetic compensation torque, generated by an additional ferromagnetic element, involved in the magnetic gear of FIG. 3.
Figure 5:
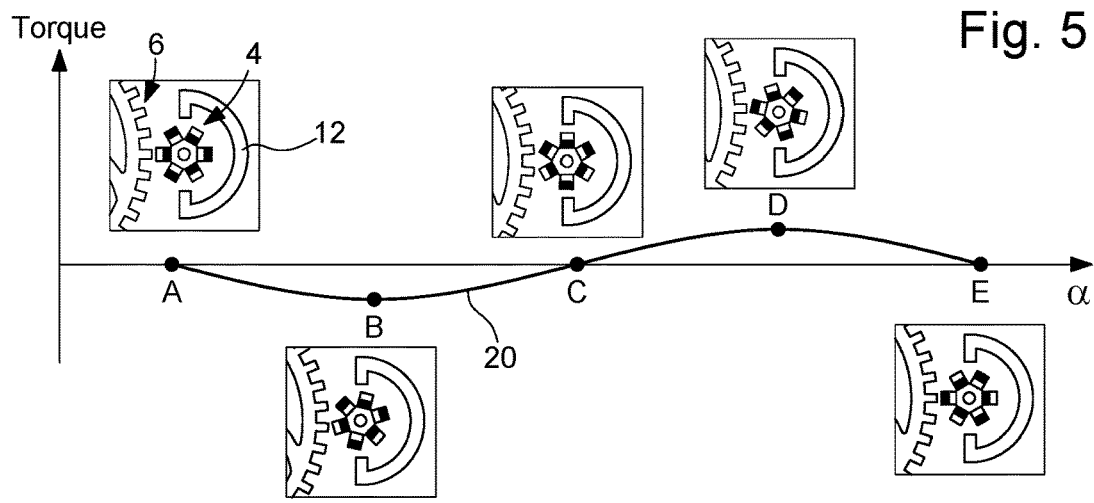
FIG. 5 graphically represents a residual magnetic disturbance torque in the magnetic gear of FIG. 3.

In a first variant, shown in FIGS. 3 to 5, magnetic gear 3 is formed of a first wheel 4 and a second wheel 6, which were described above with reference to FIG. 1. Generally, the first wheel is provided with N first alternating magnetic poles which are circularly arranged and define a first magnetic toothing. In the variant considered, first wheel 4 comprises six bipolar magnets having a radial magnetization, the six outer magnetic poles forming a first magnetic toothing 9. Since the magnetic poles are arranged in a circular manner with alternating polarisation, there is an even number of said poles. Generally, the second wheel is provided with teeth made of ferromagnetic material or second, circularly arranged, alternating magnetic poles, these teeth or second magnetic poles defining a second magnetic toothing which has a magnetic coupling with the first magnetic toothing, such that, when one of the first or second wheels is driven in rotation, this wheel rolls, via the magnetic coupling, over a geometric circle centred on the other wheel and linked to this other wheel. In the variant considered, second wheel 6 comprises a rim of ferromagnetic material defining, at its outer periphery, teeth which form a second magnetic toothing 7. The two wheels 4, 6 extend in the same general plane and are arranged such that their magnetic toothings do not touch. The magnetic disturbance torque occurring between the two wheels 4 and 6 was presented above with reference to FIG. 2.

To offset the aforementioned magnetic disturbance torque, magnetic gear 3 further includes a ferromagnetic element 12 arranged relative to first wheel 4 so as to offset, and thus cancel out, at least most of the magnetic disturbance torque (curve 10 in FIG. 2) to which the first wheel is subjected, resulting from the magnetic coupling between the two wheels 4 and 6.

Ferromagnetic element 12 is preferably arranged in the general plane of the two wheels of magnetic gear 3. This ferromagnetic element comprises two end portions 13 and 14 which extend in the direction of first toothing 9 of wheel 4, the first end portion 14 being located at an angular position equal to 90°, whereas the second end portion is located at an angular position equal to 270°. Generally, each of the end portions is positioned at an angle, relative to reference half-axis 30, whose value is equal to $(M-1/2) \cdot 360°/N$, where M is an integer number greater than '1' and less than N. It will be noted that, in a more complex variant, other projecting portions may be provided, in addition to the two end portions, each positioned at a different angle among the angles defined by the value M between '1' and N in the aforementioned mathematical formula. An intermediate portion 12A connects the two end portions. This intermediate portion has a semi-circular shape which extends in the general plane of wheel 4, on the opposite side to wheel 6. It will be noted that this intermediate portion generates a low magnetic torque on wheel 4, much lower than the magnetic disturbance torque generated by wheel 6 and than the magnetic compensation torque generated overall by ferromagnetic element 12 and mainly by the two end portions 13 and 14, which are arranged to turn inwards towards toothing 9 of wheel 4, relative to the circle defined by the intermediate portion, and therefore have a radial orientation.

Ferromagnetic element 12 is arranged to generate a magnetic compensation torque 18, represented by a curve in FIG. 4, having a periodic variation in intensity, with the same period as the periodic variation in intensity of the magnetic disturbance torque, as a function of the angular position α of wheel 4 relative to reference half-axis 30. Advantageously, the magnetic compensation torque and the magnetic disturbance torque have a phase shift of substantially 180°. Preferably, ferromagnetic element 12 is configured such that the maximum intensity (amplitude) of the magnetic compensation torque is substantially equal to that of the magnetic disturbance torque. FIG. 5 represents a residual magnetic torque that may be exerted on wheel 4. Moreover, ferromagnetic element 12, in particular the two end portions thereof, has a plane of symmetry 36 including reference half-axis 30 and central axis 32 (axis of rotation) of first wheel 4. This feature is advantageous in preventing the ferromagnetic element from generating a magnetic attraction force on wheel 4 with an orientation perpendicular to reference half-axis 30. Such a magnetic attraction force would be perpendicular to the overall radial magnetic attraction force exerted by wheel 6 on wheel 4, such that such a perpendicular magnetic attraction force would generate a friction force of the pivots of wheel 4 in the associated bearings (not represented) which define axis of rotation 32.

In an improvement to the first variant, the ferromagnetic element is arranged to be configured to generate on first wheel 4 an overall compensation magnetic attraction force, which is aligned on reference half-axis 30 with an opposite direction to that of an overall radial magnetic attraction force exerted by second wheel 6 on first wheel 4. It will be noted that the first variant already has a small compensation magnetic attraction force resulting from the semi-circular intermediate portion, but this intermediate portion mainly serves to form a magnetic circuit of low magnetic reluctance between the two end portions 13 and 14 and its magnetic attraction force on the first wheel is much lower than the radial magnetic attraction force exerted by the second wheel on this first wheel, since these two attraction forces are not of the same order of magnitude. Specific embodiments, corresponding to the improvement provided, form the subject of a second variant and of a third variant respectively shown in FIGS. 6 and 7.

Figure 6:
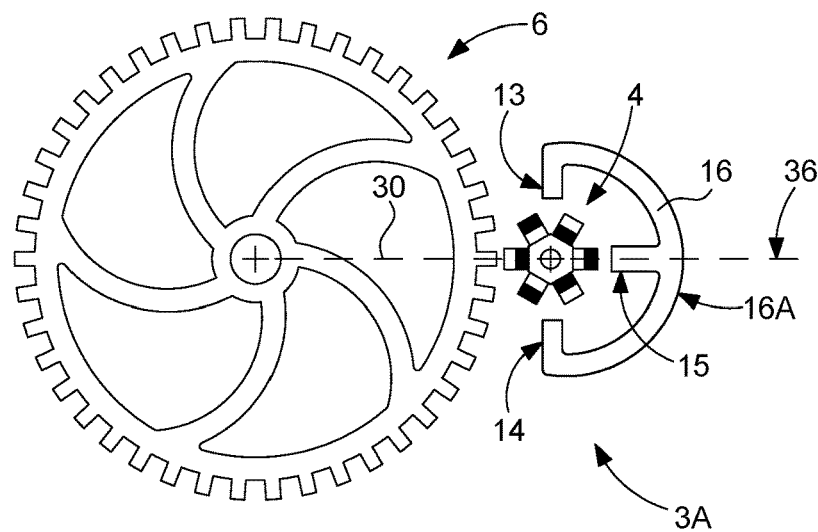
FIG. 6 shows a first variant of the first embodiment of the invention.

In the second variant of FIG. 6, magnetic gear 3A comprises a ferromagnetic element 16 provided, in addition to the two aforementioned end portions 13 and 14, with a compensation portion 15 protruding in the direction of first toothing 9 from intermediate portion 16A, this compensation portion being positioned at an angle of 180° relative to reference half-axis 30 and serving to form most of the compensation magnetic attraction force. It will be noted that compensation portion 15 has the drawback of increasing the overall magnetic disturbance torque exerted on wheel 4. However, ferromagnetic element 16 can be configured such that the two end portions 13 and 14 offset most or, preferably, substantially all of the two magnetic torques respectively generated by wheel 6 and compensation portion 15 on wheel 4. In an advantageous variant, the additional magnetic torque generated by the compensation portion can be reduced by enlarging the latter (while increasing, if necessary, the distance to the first magnetic toothing) such that the free end thereof has a semi-circular profile, centred on axis of rotation 32 of the first wheel, at a minimum distance from first magnetic toothing 9 and extends substantially over an angular period of this first magnetic toothing, which may be slightly smaller. Those skilled in the art will know how to optimise the profile and angular extent of the free end of the compensation portion to reduce the additional magnetic torque as much as possible.

Figure 7:
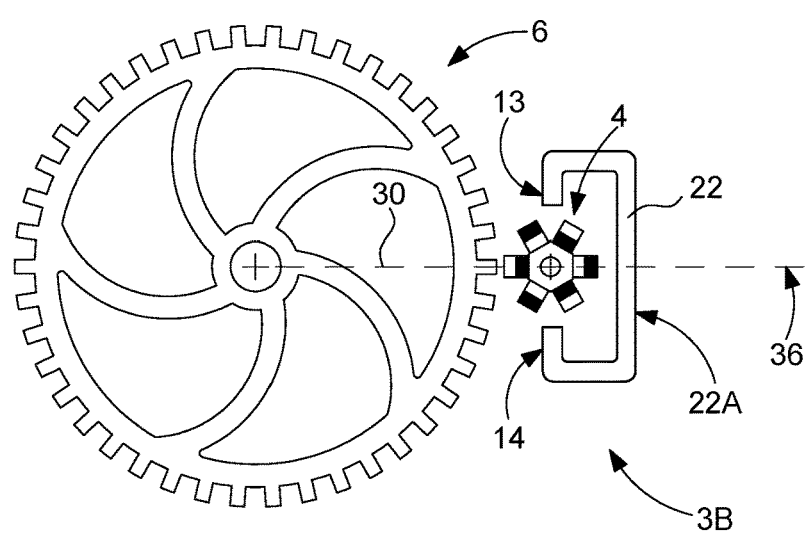
FIG. 7 shows a second variant of the first embodiment of the invention.

In the third variant of FIG. 7, magnetic gear 3B comprises a ferromagnetic element 22 whose intermediate portion 22A is configured such that it is closer to the first magnetic toothing 9 of first wheel 4 in the direction of the angular position equal to 180°, measured from reference half-axis 30, thus having a minimum distance from this first magnetic toothing in the 180° angular position. This third variant has the advantage of allowing a relatively large compensation magnetic attraction force to be obtained, notably substantially equal to the overall radial magnetic attraction force exerted by second wheel 6 on first wheel 4, without generating a high magnetic torque on the latter. Indeed, the magnetic torque generated by intermediate portion 22A is significantly lower than that generated by intermediate portion 16A of the second variant, as represented in FIG. 6. To further reduce the additional magnetic torque, which is applied to the first wheel, those skilled in the art will know how to optimise the shape of intermediate portion 22A, in particular the median part thereof.

Figure 8:
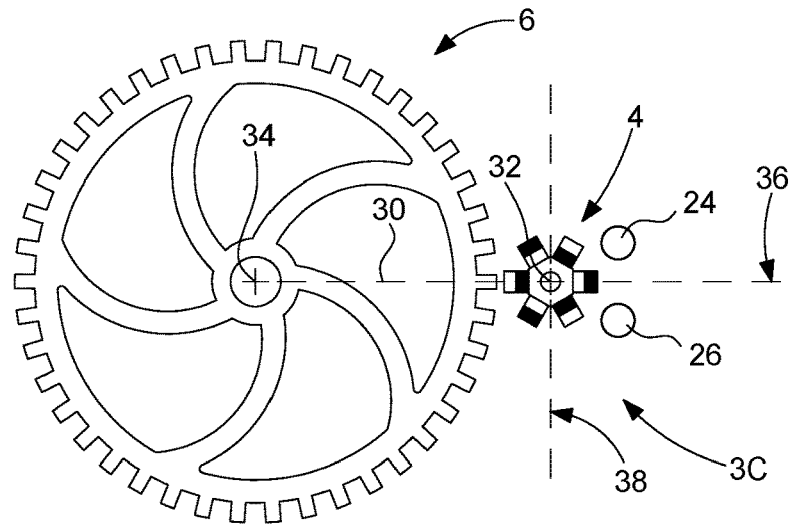
FIG. 8 shows a second embodiment of a mechanism incorporating a magnetic gear according to the invention (only the magnetic gear is shown).

Referring to FIG. 8, a preferred variant of a second embodiment of a magnetic gear 3C according to the invention will be described, which is characterized by the arrangement of a set of separate ferromagnetic elements for offsetting at least most of the magnetic disturbance torque (curve 10, FIG. 2) to which first wheel 4 is subjected, which results from the magnetic coupling to second wheel 6, in particular to second magnetic toothing 7. The set of ferromagnetic elements comprises at least two elements 24 and 26 each positioned at a different angle, relative to reference half-axis 30, whose value is equal to $(M-1/2) \cdot 360°/N$ where M is an integer number greater than '1' and lower than N.

As in the first embodiment, in a general variant, the set of ferromagnetic elements is arranged to generate a magnetic compensation torque 18 (see FIG. 4) which also has a periodic variation in intensity according to the angular position of the first wheel relative to reference half-axis 30, the magnetic compensation torque having the same angular period as the magnetic disturbance torque and having a phase shift with respect to the latter of substantially 180°.

In a first advantageous variant, the set of ferromagnetic elements is arranged mostly on an opposite side to second wheel 6 relative to a geometric plane 38 including central axis 32 of the first wheel and perpendicular to reference half-axis 30. Thus, the set of ferromagnetic elements is arranged to generate on first wheel 4 an overall compensation magnetic attraction force which is aligned on reference half-axis 30 with an opposite direction to that of an overall radial magnetic attraction force exerted by the second wheel on the first wheel. In the preferred variant, which is represented in FIG. 8, the set of ferromagnetic elements, formed by the two elements 24 and 26, is arranged entirely on one side of geometric plane 38 which is opposite to second wheel 6.

In a second advantageous variant, the set of ferromagnetic elements has a plane of symmetry 36 including reference half-axis 30 and central axis 32 of the first wheel. The preferred variant represented in FIG. 8 also falls within this second advantageous variant. The advantage resulting from such an arrangement was described above.

The invention claimed is:

1. A timepiece mechanism comprising:
    a magnetic gear train formed of a first wheel and a second wheel, the first wheel being provided with N first alternating magnetic poles which are circularly arranged and define a first magnetic toothing, N being an integer being 3 or greater, the second wheel being provided with teeth made of ferromagnetic material or with second alternating and circularly arranged magnetic poles, said teeth or said second magnetic poles defining a second magnetic toothing which has a magnetic coupling with the first magnetic toothing such that, when one of the first or second wheels is driven in rotation, said one of the first or second wheels rotates, via the magnetic coupling, over a geometric circle centered on the other of the first or second wheels and linked to said other of the first or second wheels;

a ferromagnetic element or a set of ferromagnetic elements arranged, relative to the first wheel, so as to offset at least most of a magnetic disturbance torque to which said first wheel is subjected, resulting from said magnetic coupling, said magnetic disturbance torque having a periodic variation in intensity according to an angular position of the first wheel relative to a reference half-axis starting from the central axis of the first wheel and intercepting the central axis of the second wheel.

2. The timepiece mechanism according to claim 1, wherein the ferromagnetic element or the set of ferromagnetic elements is arranged to generate a magnetic compensation torque which also has a periodic variation in intensity according to the angular position of the first wheel relative to said reference half-axis, the magnetic compensation torque and the magnetic disturbance torque having a phase shift of substantially 180°.

3. The timepiece mechanism according to claim 1, wherein said ferromagnetic element or the set of ferromagnetic elements has a plane of symmetry, the plane of symmetry including the reference half-axis and the central axis of the first wheel.

4. The timepiece mechanism according to claim 1, wherein the ferromagnetic element or the set of ferromagnetic elements is arranged to generate on the first wheel an overall compensation magnetic attraction force which is aligned on the reference half-axis with an opposite direction to that of an overall magnetic attraction force exerted by the second wheel on the first wheel.

5. The timepiece movement according to claim 4, wherein the ferromagnetic element comprises two end portions which extend radially, each positioned at an angle, relative to the reference half-axis, whose value is equal to $(M-1/2) \cdot 360°/N$, where M is an integer number greater than '1' and less than N, and an intermediate portion connecting the two end portions.

6. The timepiece mechanism according to claim 5, wherein the ferromagnetic element further comprises a compensation portion projecting in the direction of the first toothing from the intermediate portion, said compensation portion being positioned at an angle, relative to reference half-axis, whose value is equal to 180°, and serving to form most of the compensation magnetic attraction force.

7. The timepiece mechanism according to claim 5, wherein the intermediate portion of the ferromagnetic element is configured such that said intermediate portion is closest to the first magnetic toothing in the direction of the angular position equal to 180°, measured from the reference half-axis, thereby exhibiting a minimum distance from this first magnetic toothing in the 180° angular position.

8. The timepiece mechanism according to claim 4, wherein said set of ferromagnetic elements comprises two elements each positioned at an angle, relative to the reference half-axis, whose value is equal to $(M-1/2) \cdot 360°/N$, where M is an integer number greater than '1' and lower than N.

9. The timepiece mechanism according to claim 4, wherein the set of ferromagnetic elements is arranged on an opposite side to the second wheel relative to a geometric plane comprising the central axis of the first wheel and perpendicular to the reference half-axis.

10. The timepiece mechanism according to claim 8, wherein the set of ferromagnetic elements is arranged on an opposite side to the second wheel relative to a geometric plane comprising the central axis of the first wheel and perpendicular to the reference half-axis.

* * * * *